May 3, 1960 G. R. CURTIS 2,935,710
ELECTRIC TRANSDUCER
Filed Sept. 9, 1957 3 Sheets-Sheet 1

INVENTOR.
GERALD R. CURTIS
BY
ATTORNEYS

May 3, 1960

G. R. CURTIS 2,935,710

ELECTRIC TRANSDUCER

Filed Sept. 9, 1957

INVENTOR.
GERALD R. CURTIS

BY

*Christie, Parker & Hale*

ATTORNEYS

May 3, 1960 G. R. CURTIS 2,935,710
ELECTRIC TRANSDUCER

Filed Sept. 9, 1957 3 Sheets-Sheet 3

INVENTOR.
GERALD R. CURTIS

BY
*Christie, Parker & Hale*
ATTORNEYS

United States Patent Office 2,935,710
Patented May 3, 1960

2,935,710

ELECTRIC TRANSDUCER

Gerald R. Curtis, Duarte, Calif., assignor to Bell & Howell Company, Chicago, Ill., a corporation of Illinois Application September 9, 1957, Serial No. 682,729

15 Claims. (Cl. 338—4)

This invention relates to a condition responsive measurement and particularly to an electromechanical transducer for electrically measuring physical parameters, such as pressure and acceleration.

Electromechanical transducers frequently depend upon a strain sensitive wire incorporated in a resistance bridge circuit and arranged on a mechanical system to be under tensile stress. The system is adapted so that small variations in a force to be measured change the tensile stress of the wire, thereby affecting the electrical resistance of the wire. Measurement of the resistance change in the wire, achieved by incorporating the wire in a conventional resistance bridge, provides an accurate measurement of the force variation.

Existing transducers intended for measurement of force variations within a small range are precision instruments, requiring skill and special apparatus in their construction and repair. The utility and versatility of electromechanical transducers would be markedly enhanced if a transducer were available which contained a minimum number of precision parts so that the skill required for construction and maintenance of the instrument would be reduced. My invention provides an electromechanical transducer which possesses this feature without sacrifice of the characteristics of accuracy, linearity of response and minimum sensitivity to forces other than the parameter of interest.

My invention is a force sensitive element for use in an electromechanical transducer. It comprises a supporting means to which spaced apart flexible spring members are joined. A first strain sensitive wire interconnects the flexible spring members. A force responsive means is adapted to be displaced in response to variations in the physical parameter to be sensed. A second strain sensitive wire interconnects the flexible spring members and the force responsive means.

The strain sensitive wire interconnecting the flexible spring members and the strain sensitive wire interconnecting the flexible spring members with the force responsive means are placed under equal tension and equally coact to distend the flexible spring members at equilibrium. The wire is electrically connected so that four active arms of a resistance bridge are formed. The system is adapted so that displacement of the force responsive means along a force axis is essentially normal to the strain sensitive wire. Such displacement in a given direction along the force axis in response to variations in the force acting upon it causes a decrease in tension in the wire comprising two arms of the resistance bridge and an increase in tension in the wire comprising the other two arms of the resistance bridge. Displacement of the force responsive means in the opposite direction along the force axis produces an opposite effect with respect to the tension of the wire comprising the arms of the resistance bridge. Since the strain sensitive wire and the flexible spring members are in a tensile equilibrium initially, displacement of the force responsive means affects the tension of the wires forming all arms of the bridge circuit.

In a preferred embodiment of the invention, the system is arranged so that each turn of the strain sensitive wire forms an angle of approximately 90°. In this manner, an essentially linear electrical output is obtained.

The force sensitive element of the invention can be adapted through the use of appropriate force responsive means to sense pressure, acceleration, displacement and any other parameters which can be expressed as a force. When the force sensitive element is incorporated to provide an electromechanical transducer, an instrument is obtained which accurately measures small variations in the parameter of interest. Further, the particular configuration of the force sensitive element produces the maximum electrical output of which the wire is capable, enabling use of the instrument to drive other components.

The force sensitive element of the invention and its manner of use will be more clearly understood from the following description taken in conjunction with the accompanying drawings in which.

Figure 1:
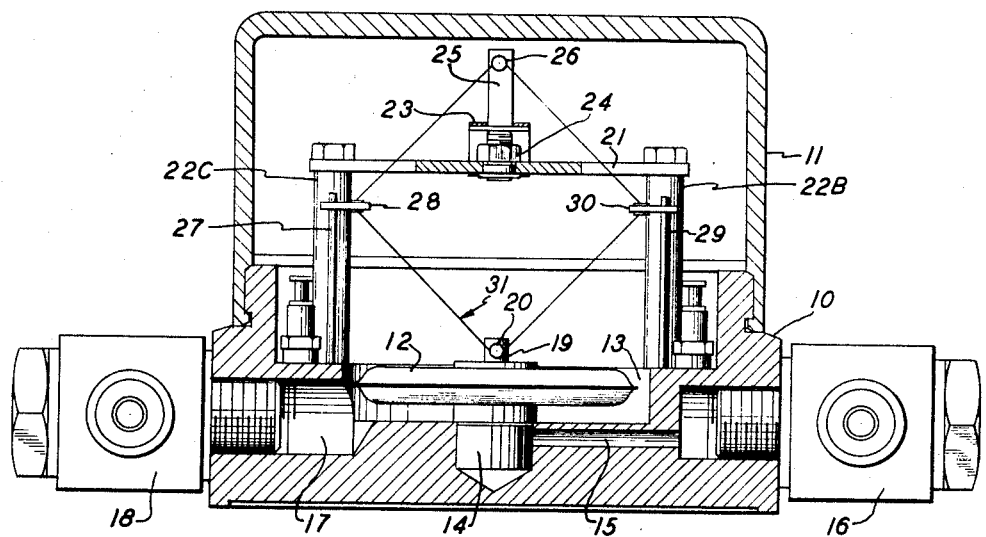
Fig. 1 is a sectional elevation showing the manner of using an embodiment of the force sensitive element of the invention in a pressure sensitive transducer.
Figure 2:
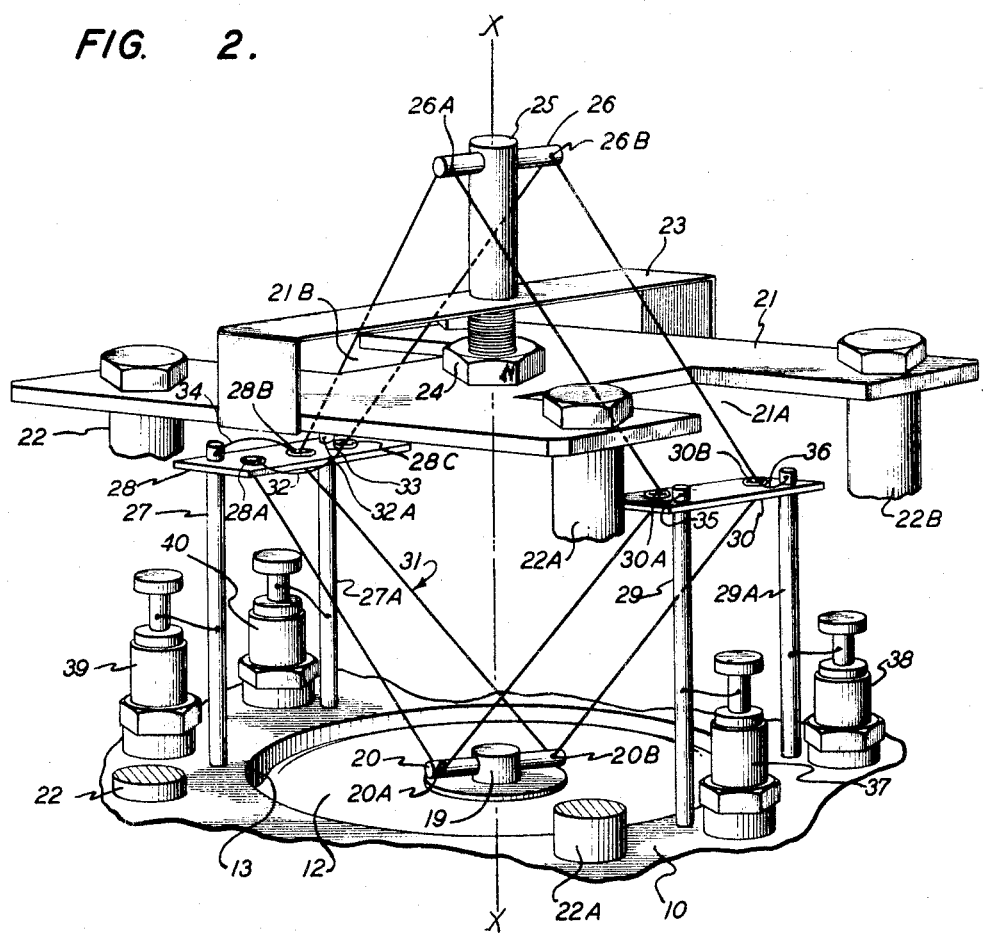
Fig. 2 is a perspective view, partially cut away, of the force sensitive element shown in Fig. 1 together with a part of the supporting structure.

With reference to Figs. 1 and 2, a base 10 is joined to a housing 11 so as to form a fluid-tight enclosure. A pressure-responsive capsule 12 is rigidly held within a recess 13 centrally located in the base. The pressure-sensitive capsule is made of a material susceptible to deformation upon the application of a force. The interior of the capsule is connected by a fitting 14 through a first channel 15 within the base to a first adapter 16. The first adapter may be connected to a source of varying pressure so that such pressure is transmitted to the interior of the pressure capsule. The recess in which the capsule is positioned is connected by a second channel 17 to a second adapter 18. In this manner the exterior surroundings of the capsule are connected to ambient pressure or to a secondary source of varying pressure in the event the transducer is to be used to measure the simultaneously occurring pressure differential between two regions.

A first support pin 19 is joined to the pressure-responsive capsule in a central location. The support pin contains a cross piece 20 projecting from each side of the support pin and having at its extremities holes 20A and 20B, respectively. The cross piece is made of an insulating material, such as plastic. The support pin is adapted to move responsive to the displacement of the force-responsive pressure capsule. The direction of this movement is along line X—X shown in Fig. 2, the so-called force axis.

To provide a stationary platform elevated by a fixed distance from the base, a first support plate 21 is joined at its four corners to supporting rods 22, 22A, 22B, and 22C respectively the rods being joined at their other end to the base. Two slots 21A and 21B are provided in opposite sides of the first support plate. A second support plate 23 is spaced above the first support plate in a parallel, horizontal plane by means of an adjusting screw 24. A second support pin 25 containing a cross piece 26 is joined to the second support plate so as to be opposite to the first support pin. The cross piece of the second support pin contains at its extremities holes 26A and 26B respectively.

It is to be understood that the four supporting rods and both support plates comprise merely a rigid supporting structure for the second support pin. Various structural modifications may be made in this supporting structure without departing from its primary function.

A first pair of flexible spring members 27 and 27A is joined by suitable means to the base at points on one side of the recess. A first support platform 28 containing three substantially equally spaced holes 28A, 28B and 28C is joined to the free ends of the first pair of flexible spring members, thereby joining the two flexible spring members. A second pair of flexible spring members 29 and 29A is joined by suitable means to the base on the other side of the recess so as to be substantially opposite to the first pair of flexible spring members. A second support platform 30 containing two holes 30A and 30B is joined to the free ends of the second pair of flexible spring members. Each platform is made of an insulating material. Into each hole of each platform is pressed a conductive eyelet so that a conductive wire may be joined as by solder to the eyelet within a hole.

The spatial configuration of the first and second support pins and the first and second support platforms may be more readily visualized if each of these is regarded as a point representing the corner of a square. A plane would pass through all four points, and a line connecting the four points would outline a square tilted so as to be balanced on the first support pin.

A description of one method by which a strain sensitive wire 31 may be wound so as to interconnect the flexible spring members with the support pins and thereby to form the strain sensitive element will readily demonstrate the ease with which the strain sensitive element of this invention may be constructed. One end of the strain sensitive wire is joined as by solder to the eyelet in hole 28A of the first support platform. It is then wound so as to pass successively through hole 20A of the first support pin, hole 30A of the second support platform, hole 26A of the second support pin, hole 28B of the first support platform, hole 20B of the first support pin, hole 30B of the second support platform and hole 26B of the second support pin, and it terminates at hole 28C of the first support platform. The wire is then pulled to place all portions of the winding under equal tension. Any differences in length are balanced by adjusting the position of the second support plate, and therefore the second support pin, by means of the adjusting screw. The wire is then rigidly joined to the eyelets within the holes in the platforms through which the wire passes and is appropriately connected so as to form four arms of an electrical bridge.

The use of a continuous strain sensitive wire provides the most convenient method of winding the force sensitive element of the invention. After the wire is rigidly joined at the points specified above, its segments act separately. Accordingly, it is possible to use separate wires to form the winding although in so doing, the distinctive advantage of ease of assembly of this force sensitive element is minimized.

A connecting wire 32 joins the strain sensitive wire where it passes through holes 28A and 28C in the first support platform. It provides a means for the fine adjustments needed to correct for changes in resistance of the wire due to thermal changes. An electrical input wire 33 may be joined to the connecting wire at any point 32A. A wire 34 joined to the strain sensitive wire where it passes through hole 28B in the first support platform provides a second electrical input wire. A wire 35 joined to the strain sensitive wire at hole 30A and a wire joined to the strain sensitive wire at hole 30B provide two electrical output leads for the bridge circuit.

The first and second pairs of flexible spring members are made of electrically conductive material. Therefore the input electrical leads to the bridge circuit are separately connected to the first pair of flexible spring members and the output electrical leads are separately connected to the second pair of flexible spring members. Although not shown, means are provided to insulate the flexible spring members from the base. The first pair of flexible spring members is separately connected to electrical terminal posts 37 and 38 and the second pair of flexible spring members is separately connected to electrical terminal posts 39 and 40. Since electrical connections are provided through the flexible spring members, a minimum mass is used and no restraint to movement is imposed as would be the case if conventional electrical connections were made to the resistance bridge.

Figure 3:
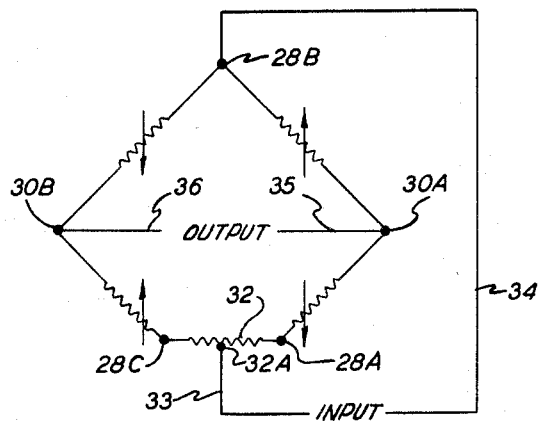
Fig. 3 is a circuit diagram showing the circuitry employed in conjunction with the transducer.

The four arms of the electrical resistance bridge are shown in the circuit diagram provided in Fig. 3. In this circuit diagram, reference characters identical to those used in Figs. 1 and 2 have been used to identify the connecting points and lead wires. A convenient method for defining the length of each of the arms of the resistance bridge is in terms of the reference characters given to those holes through which the strain sensitive wire passes in the two support pins and the two support platforms. In these terms, one arm of the resistance bridge is defined by the reference characters 32A—28A—20A—30A. A second arm of the resistance bridge is defined by the reference characters 30A—26A—28B. A third arm of the bridge circuit is defined by the reference characters 28B—20B—30B. The fourth arm of the bridge circuit is defined by the reference characters 30B—26B—28C—32A.

The force sensitive element of this embodiment of the invention is formed by arms 30A—26A—28B and 30B—26B—28C—32A of the strain sensitive wire interconnecting the two flexible spring members and arms 32A—28A—20A—30A and 28B—20B—30B of the strain sensitive wire interconnecting the two flexible spring members with the support pin joined to the pressure sensitive capsule. The strain sensitive wire is in a tensile equilibrium with the two flexible spring members. A variation in the pressure of interest causes a movement of the pressure sensitive capsule so that the first support pin joined to it will move in one of two directions along force axis X—X. If, for example, a pressure increase occurs, the upward movement of the first support pin will cause the tension of two arms of the resistance bridge, 32A—28A—20A—30A and 28B—20B—30B to decrease. Since at equilibrium, the flexible spring members are held under the tension placed upon the system by the strain sensitive wire, the slackening of two arms of the resistance bridge causes an increase in tension of the remaining two arms of the resistance bridge 30A—26A—28B and 30B—26B—28C—32A. As a result, the sum of the forces coacting on the flexible spring members remains substantially constant. The changes in tension of the arms of the resistance bridge affects the electrical resistance of each of the arms. The changes in resistance can be measured electrically and calibrated to provide a measure of the force variation. It can be seen that each of the four arms of the resistance bridge is an active arm since displacement of the pressure sensitive capsule affects the resistance of each arm.

In the event of a decrease of pressure in the region of interest, the movement of the first support pin is downward along force axis X—X. Accordingly, an increase in tension in arms 32A—28A—20A—30A and 28B—20B—30B occurs and a decrease in tension in arms 30A—26A—28B and 30B—26B—28C—32A occurs.

While a pressure sensitive capsule is shown as the pressure responsive means in Figs. 1 and 2, it is apparent that other pressure responsive means may be used in conjunction with the force sensitive element of this invention to provide a pressure responsive transducer. For example, the first support pin may be mounted on a deformable member, such as a plate diaphragm against which the pressure of interest directly acts. In the alternative, the support pin may be mounted on top of a bellows, the interior of which is subjected to the pressure of interest. Such modifications in the adaptation of the force sensitive element of this invention in no way affect the basic concept.

The structural arrangement about which the strain sensitive wire is wound in the embodiment shown in Figs. 1 and 2 provides a 90° angle between each turn of the wire. This arrangement provides a system giving maximum electrical linearity in response to variations in the parameter of interest. Accordingly, for many applications, this is a preferred embodiment. There exist applications in which a non-linear electrical output can be used. To achieve this, a winding of the strain sensitive wire in a manner different from the embodiment shown in Figs. 1 and 2 can be used.

Figure 4:
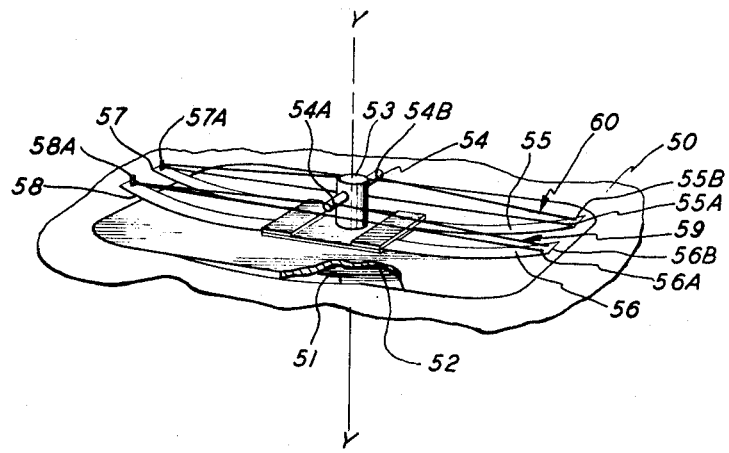
Fig. 4 is a perspective view, partially cut away, showing another embodiment of the force sensitive element of the invention in a pressure sensitive transducer.

In Fig. 4 a perspective view, partially cut away, of another embodiment of the force sensitive element of the invention is shown. A base 50 contains a centrally located recess 51 in which is positioned a pressure-sensitive means 52, identical to the one described in conjunction with Figs. 1 and 2. A support pin 53 is joined to the pressure-sensitive means in a central location. The support pin contains a cross piece 54 having at each longitudinal end a hole 54A and 54B respectively. On one side of the recess, a first pair of flexible spring members 55 and 56 are joined at one end to the base. The two flexible spring members are positioned in a parallel spaced apart relationship. On the other side of the recess, a second pair of flexible spring members 57 and 58 are joined at one end to the base piece and positioned so as to be opposite to the first pair of flexible spring members. In this manner, flexible spring member 55 and flexible spring member 57 form one opposed pair of flexible spring members. Flexible spring member 56 and flexible spring member 58 form a second opposed pair of flexible spring members.

A first strain sensitive wire 59 is joined to the free end of flexible spring member 56 at point 56A and extended so as to circumscribe a pin 58A at the free end of flexible spring member 58, thereby forming a first leg. A second leg is formed by extending the wire from the pin, passing it through hole 54A of the support pin and returning it to point 56B adjacent to but separate from point 56A at the free end of flexible spring member 56. A second strain sensitive wire 60 is joined at one end to point 55A near the free end of flexible spring member 55 and extended so as to circumscribe pin 57A near the free end of flexible spring member 57, thereby forming a first leg. A second leg is formed by extending the wire from the pin, passing it through hole 54B of the support pin and returning it to point 55B adjacent to but separate from point 55A at the free end of flexible spring member 55.

Each of the strain sensitive wires is wound and then pulled so as to place each opposed pair of flexible spring members under tension. Each wire is joined to the support pin at the points through which it passes. In this manner a four arm resistance bridge is formed. One arm of the resistance bridge is defined by points 56A—58A. A second arm of the resistance bridge is defined by points 58A—54A—56B. A third arm of the resistance bridge is defined by points 55A—57A. A fourth arm of the resistance bridge is defined by points 57A—54B—55B. Electrical leads suitable to provide electrical input and output to the bridge circuit are provided.

In operation, an upward movement of the support pin along a force axis Y—Y caused by a displacement of the pressure sensitive means, results in an increase in tension in the wire forming arms 58A—54A—56B and 57A—54B—55B. Since the flexible spring members are weaker than the strain sensitive wire, an inward movement of each of the flexible spring members results, thereby causing a decrease in tension in the wire forming arms 56A—58A and 55A—57A. These changes in tension in the wire forming the arms of the resistance bridge affect the electrical resistance of each of the four arms. A measurement of the pressure change is thereby provided. It follows that a downward movement of the support pin along force axis Y—Y would cause an opposite effect with regard to the tension of the wire forming each of the four arms of the bridge circuit.

It can readily be seen that various angles can be imposed on the wires passing through support pin 53. The angle used is dependent upon the type of electrical output desired for the particular application.

The force sensitive element shown in Fig. 4 may be incorporated in electromechanical transducers designed to measure any parameter which can be expressed as a force provided a suitable force responsive means is incorporated.

Figure 5:
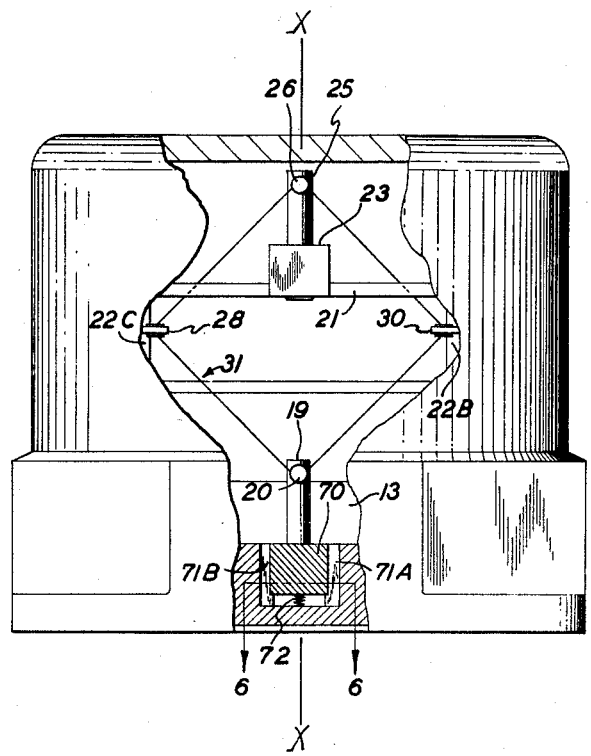
Fig. 5 is a sectional elevation of a transducer for sensing acceleration in accordance with the invention.
Figure 6:
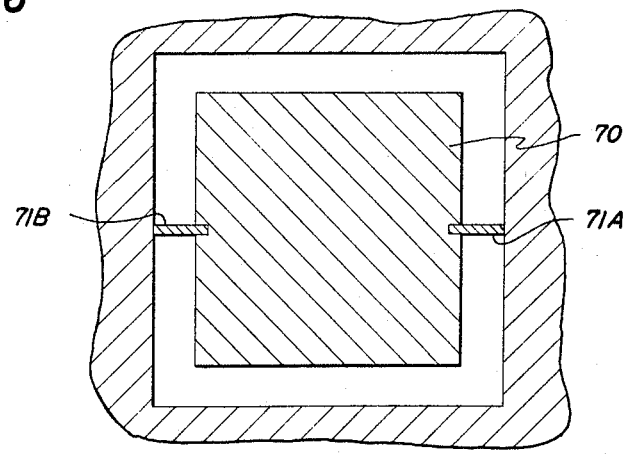
Fig. 6 is a sectional view taken along line 6—6 of Fig. 5.

In Figs. 5 and 6 the force sensitive element of the invention shown in Figs. 1 and 2 is shown as a component of an accelerometer. With the exception of the force responsive means, the transducer is the same as the pressure sensitive transducer described in Figs. 1 and 2. In the accelerometer, a mass 70 is connected to support pin 19 and is limited to movement of the force axis X—X by a conventional type of frictionless guides 71A and 71B. A spring 72 supports the mass at equilibrium. Any acceleration or displacement of the transducer along the force axis will be detected by displacement of mass 70 with respect to the housing. Correlative displacement of support pin 19 with consequent variation in the strain imposed on strain sensitive wire 31 provides a measurement of the force imposed in the same manner as described in conjunction with Figs. 1 and 2.

The force sensitive element of the invention embodies numerous advantages when used in an electromechanical transducer. It utilizes a minimum number of precision parts and is constructed in a manner such that a relatively unskilled person is able to wind the force sensitive element. Similarly, it can be easily repaired so that repairs may be made wherever the instrument is being utilized.

The force sensitive element of the invention does not require the use of stops limiting displacement of the force responsive means so as to protect the strain sensitive wire from overloading. With a continuing displacement of the force responsive means in one direction, a first pair of wires will continue to increase in tension and the second pair of wires will continue to decrease in tension until the latter pair becomes completely slack. Thereupon, since the flexible spring members yield more readily than the wire, further displacement of the force responsive means will only slightly increase the tension in the first pair of wires.

It follows that the arrangement of the wires in the force sensitive element provides the further advantage that the maximum electrical output of which the wire is capable is attained. This is because the strain imposed on each pair of wires can be varied the maximum possible amount, namely, from a condition of slackness to a condition only slightly below the yield point of the wire. The electrical resistance of each pair of wires can be accordingly varied over this maximum range.

Since displacement of the force responsive means can be continued until one pair of wires becomes slack, the force sensitive element of the invention is adapted for uses where a large range of movement is required, as, for example, certain profilimeters.

A further advantage is that displacement of the force responsive means is transmitted directly to the wire, so that the instrument possesses a high degree of sensitivity.

It is to be understood that the force sensitive element of this invention may be conveniently adapted to respond to a variety of forces. In addition to the specific embodiments shown herein, it is apparent that any parameter in which a displacement occurs can be measured through the use of this force sensitive element in conjunction with an appropriate force responsive means.

I claim:

1. A force sensitive element for an electromechanical transducer comprising a supporting means, flexible spring members spaced apart and joined to the supporting means, a first strain sensitive wire interconnecting the flexible spring members, a force responsive means supported by the supporting means and adapted to displacement responsive to variations in a parameter to be sensed, and a second strain sensitive wire interconnecting the flexible spring members and the force responsive means, the entire system being under tension.

2. A force sensitive element for an electromechanical transducer comprising a supporting means, flexible spring members spaced apart and joined to the supporting means, a first strain sensitive wire interconnecting the flexible spring members, a force responsive means supported by the supporting means and adapted to displacement responsive to variations in a parameter to be sensed, and a second strain sensitive wire interconnecting the flexible spring members and the force responsive means, the first and second strain sensitive wires being under tension at equilibrium and equally coacting to distend the flexible spring members.

3. A force sensitive element for an electromechanical transducer comprising a supporting means, flexible spring members spaced apart and joined to the supporting means, a first strain sensitive wire interconnecting the flexible spring members, a force responsive means supported by the supporting means and adapted to displacement responsive to variations in a parameter to be sensed, and a second strain sensitive wire interconnecting the flexible spring members and the force responsive means, the first and second strain sensitive wires being under equal tension at equilibrium and equally coacting to distend the flexible spring members, the second strain sensitive wire being adapted to vary in tension responsive to displacement of the force responsive means, and to deflect proportionately the flexible spring members, thereby producing an opposite change in the tension of the first strain sensitive wire.

4. A force sensitive element for an electromechanical transducer comprising a base, a force responsive means supported by the base and adapted to displacement responsive to variations in a parameter to be sensed, a supporting means spaced apart from the base by rigid supports and positioned substantially opposite to the force responsive means, first and second pairs of flexible spring members joined to the base to be substantially opposite, and a strain sensitive wire interconnecting the first and second pairs of flexible spring members, the force responsive means and the supporting means in a bifilar relationship.

5. Apparatus in accordance with claim 4 wherein each interconnecting turn of the strain sensitive wire forms an angle of substantially 90°.

6. Apparatus in accordance with claim 4 wherein the first and second pairs of flexible spring members are electrically conductive and act as electrical input and output leads.

7. A force sensitive element for an electromechanical transducer comprising a base, a force responsive means supported by the base and adapted to displacement responsive to variations in a parameter to be sensed, a supporting means spaced apart from the base by rigid supports and positioned substantially opposite to the force responsive means, two pairs of flexible spring members joined to the base to be substantially opposite, a first pair of strain sensitive wires interconnecting under tension the two pairs of flexible spring members and the supporting means and a second pair of strain sensitive wire interconnecting under tension the two pairs of flexible spring members and the force responsive means, the second pair of strain sensitive wires being adapted to vary in tension responsive to displacement of the force responsive means and to deflect proportionately the flexible spring members, thereby producing an opposite change in the tension of the first pair of strain sensitive wires.

8. Apparatus in accordance with claim 7 wherein the two pairs of strain sensitive wires are adapted to incorporation in respectively opposite arms of a resistance bridge.

9. A force sensitive element for an electromechanical transducer comprising a base, a force responsive means centrally positioned in the base, two pairs of opposed flexible spring members joined to the base and spaced apart on opposite sides of the force responsive means, a first and a second strain sensitive wire each interconnecting under tension one opposed pair of flexible spring members by a first leg and directly interconnecting under tension the opposed pair of flexible spring members and the force responsive means by a second leg, the second leg of each strain sensitive wire being adapted to vary in tension responsive to displacement of the force responsive means, thereby deflecting the flexible spring members and producing an opposite change in the tension of the first leg.

10. Apparatus in accordance with claim 9 wherein the first legs of the strain sensitive wire and the second legs of the strain sensitive wires are adapted to incorporation as respectively opposite arms of a resistance bridge.

11. An electrical mechanical transducer comprising a base, a housing joined to the base to form an enclosure, a force sensitive element mounted within the enclosure and including a force responsive means supported by the base and adapted to displacement responsive to variations in a parameter to be sensed, flexible spring members spaced apart and joined to the base, a first strain sensitive wire interconnecting under tension the flexible spring members, and a second strain sensitive wire interconnecting under tension the flexible spring members and the force responsive means, the second strain sensitive wire being adapted to vary in tension responsive to displacement of the force responsive means and to deflect proportionately the flexible spring members, thereby producing an opposite change in the tension of the first strain sensitive wire.

12. Apparatus in accordance with claim 11 wherein the force responsive means is a pressure sensitive capsule deformable proportionate to variation in pressure applied to its surfaces and a pin adapted to move along a given axis responsive to displacement of the capsule and having means to interconnect the second strain sensitive wire.

13. Apparatus in accordance with claim 11 wherein the force responsive means is a mass movably mounted in the base and a pin adapted to move along a given axis responsive to displacement of the mass and having means to interconnect the second strain sensitive wire.

14. An electrical mechanical transducer comprising a base, a housing joined to the base to form an enclosure, a force sensitive element mounted within the enclosure and including a force responsive means supported by the base and adapted to displacement responsive to variations in a parameter to be sensed, a supporting means spaced apart from the base by rigid supports and positioned substantially opposite to the force responsive means, two pairs of flexible spring members joined to the base to be substantially opposite, a first pair of strain sensitive wires interconnecting under tension the two pairs of flexible spring members and the supporting means and a second pair of strain sensitive wires interconnecting under tension the two pairs of flexible spring members and the force responsive means, the second pair of strain sensitive wires being adapted to vary in tension responsive to displacement of the force responsive means and to deflect proportionately the flexible spring members thereby producing an opposite change in the tension of the first pair of strain sensitive wires.

15. An electrical mechanical transducer comprising a base, a housing joined to the base to form an enclosure, a force sensitive element mounted within the enclosure and including a force responsive means centrally positioned in the base, two pairs of opposed flexible spring members joined to the base and spaced apart on opposite sides of the force responsive means, a first and a second strain sensitive wire each interconnecting under tension one opposed pair of flexible spring members by a first leg and directly interconnecting under tension the opposed pair of flexible spring members and the force responsive means by a second leg, the second leg of each strain sensitive wire being adapted to vary in tension responsive to displacement of the force responsive means, thereby deflecting the flexible spring members and producing an opposite change in the tension of the first leg.

References Cited in the file of this patent

UNITED STATES PATENTS

| | | |
|---|---|---|
| 2,600,701 | Statham | June 17, 1952 |
| 2,721,919 | Li et al. | Oct. 25, 1955 |